United States Patent
Barowski et al.

(10) Patent No.: US 9,733,945 B2
(45) Date of Patent: Aug. 15, 2017

(54) PIPELINING OUT-OF-ORDER INSTRUCTIONS

(71) Applicant: International Business Machines Corporation, Armonk, NY (US)

(72) Inventors: Harry Barowski, Boeblingen (DE); Tim Niggemeier, Laatzen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/058,902

(22) Filed: Mar. 2, 2016

(65) Prior Publication Data

US 2016/0179551 A1   Jun. 23, 2016

Related U.S. Application Data

(63) Continuation of application No. 13/927,372, filed on Jun. 26, 2013, now Pat. No. 9,395,996.

(30) Foreign Application Priority Data

Jun. 26, 2012  (GB) .................................... 1211274

(51) Int. Cl.
*G06F 9/30* (2006.01)
*G06F 9/38* (2006.01)

(52) U.S. Cl.
CPC .......... *G06F 9/3836* (2013.01); *G06F 9/3826* (2013.01); *G06F 9/3832* (2013.01); *G06F 9/3857* (2013.01); *G06F 9/3867* (2013.01); *G06F 9/3869* (2013.01); *G06F 9/3873* (2013.01)

(58) Field of Classification Search
None
See application file for complete search history.

(56) References Cited

U.S. PATENT DOCUMENTS

| | | | |
|---|---|---|---|
| 6,279,100 B1 * | 8/2001 | Tremblay | G06F 9/30112 712/219 |
| 7,363,467 B2 | 4/2008 | Vajapeyam et al. | |
| 7,478,225 B1 | 1/2009 | Brooks et al. | |
| 8,539,491 B1 * | 9/2013 | Small | G06F 9/5083 718/102 |
| 9,395,996 B2 * | 7/2016 | Barowski | G06F 9/3836 |
| 2010/0318775 A1 | 12/2010 | Barry et al. | |

* cited by examiner

Primary Examiner — Cheng-Yuan Tseng
(74) Attorney, Agent, or Firm — DeLizio Law, PLLC

(57) ABSTRACT

Systems, methods and computer program product provide for pipelining out-of-order instructions. Embodiments comprise an instruction reservation station for short instructions of a short latency type and long instructions of a long latency type, an issue queue containing at least two short instructions of a short latency type, which are to be chained to match a latency of a long instruction of a long latency type, a register file, at least one execution pipeline for instructions of a short latency type and at least one execution pipeline for instructions of a long latency type; wherein results of the at least one execution pipeline for instructions of the short latency type are written to the register file, preserved in an auxiliary buffer, or forwarded to inputs of said execution pipelines. Data of the auxiliary buffer are written to the register file.

14 Claims, 9 Drawing Sheets

PIPELINING OUT-OF-ORDER INSTRUCTIONS

CROSS-REFERENCE TO RELATED APPLICATION

This application is a continuation of U.S. application Ser. No. 13/927,372 filed Jun. 26, 2013, which claims priority under 35 U.S.C. 119 from United Kingdom Patent Application No. UK1211274 filed Jun. 26, 2012, the entire contents of which are each incorporated herein by reference.

BACKGROUND

Field of the Invention

The embodiments relate to data processing systems, and more specifically, to pipelining out-of-order instructions.

Since modern microprocessors use out-of-order execution to increase the effectiveness of the superscalar instruction flow up to several hundreds of instructions are executed in parallel. Instructions can vary in complexity, thus complex mathematical floating point operations are usually executed in four to forty execution cycles, whereas simple integer type instructions are executed within one cycle. Thus different architectures implement different execution pipelines with varying fixed instruction execution length according to the complexity type of operations. Thus short running instructions also referred to as short instruction represent a pool of simple instructions like integer arithmetic based on adders or rotate/shift instructions or bit/byte permutations. Floating point arithmetic or complex integer operations like multiply or divide are thus representing a pool of long running instructions also referred to as long instruction. Typically these two classes of instructions are issued and executed on different execution units or even cores, whereas the instructions are stored in common instruction queues (reservation states) prior to issue. An instruction is sent to execution if the source operands are valid and the execution units are available, i.e. non-busy. Also the result of the execution unit can be stored back into the target register for instruction completion thus requiring access to the result bus and write port to the register file. Since result forwarding busses and write ports into the register file are costly with respect to complexity, timing and power consumption those resources are limited—and hence the out-of-order issue logic also has to schedule the instruction issue based on writeback resources.

If two or more instruction classes also referred to as latency types with different execution lengths or latencies are issued generally long running instruction are given higher priority to prevent pipeline stalls. On the other hand the long running instructions reserve writeback resources which prevent to issue short running instructions since there is no path available to allow result writeback of the short latency instruction to the register file. However another long running instruction will find a writeback path and thus is eligible for issue once the source operands are valid. Thus in applications with lot of long running instructions short running instructions produce a pipeline stall since there are not sufficient enough issue situations.

Mixed pipeline length in an out-of-order instruction scheduling unit might cause unexpected issue stalls, since shorter instructions cannot be issued due to writeback conflicts with longer running instructions.

Shorter pipeline lengths are beneficial for instruction throughput for dependent instructions. Thus equalizing all execution pipelines to overcome the unexpected pipeline stalls is not recommended.

Additional writeback paths require additional write ports for the register file and additional multiplexer inputs for the operand input latches of the functional units and add complexity, latency and power.

SUMMARY

Systems, methods and computer program products for pipelining out-of-order instructions include chaining at least two short instructions of a first latency type to correspond with a latency of a long instruction of a longer second latency type; thereby forming an instruction chain; and pipelining the instruction chain together with the long instructions.

In another embodiment, a system for pipelining out-of-order instructions comprises an instruction reservation station for short instructions of a first latency type and long instructions of a longer second latency type, an issue queue containing at least two short instructions of the first latency type, which are chained to an instruction chain matching a latency of a long instruction of the second latency type, a register file, at least one execution pipeline for instructions of the first latency type and at least one execution pipeline for instructions of the second latency type; wherein results of the at least one execution pipeline for short instructions of the first latency type are written to the register file or preserved in an auxiliary buffer or forwarded to inputs of the execution pipelines; and wherein data of the auxiliary buffer are written to the register file.

In another embodiment, a data processing program for execution in a data processing system comprises software code portions for performing a method for pipelining out-of-order instructions when the program is run on the data processing system.

In yet another embodiment, a computer program product stored on a computer-usable medium, comprises computer-readable program means for causing a computer to perform a method for pipelining out-of-order instructions when the program is run on the computer.

The above, as well as additional purposes, features, and advantages of the inventive subject matter will become apparent in the following detailed written description.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
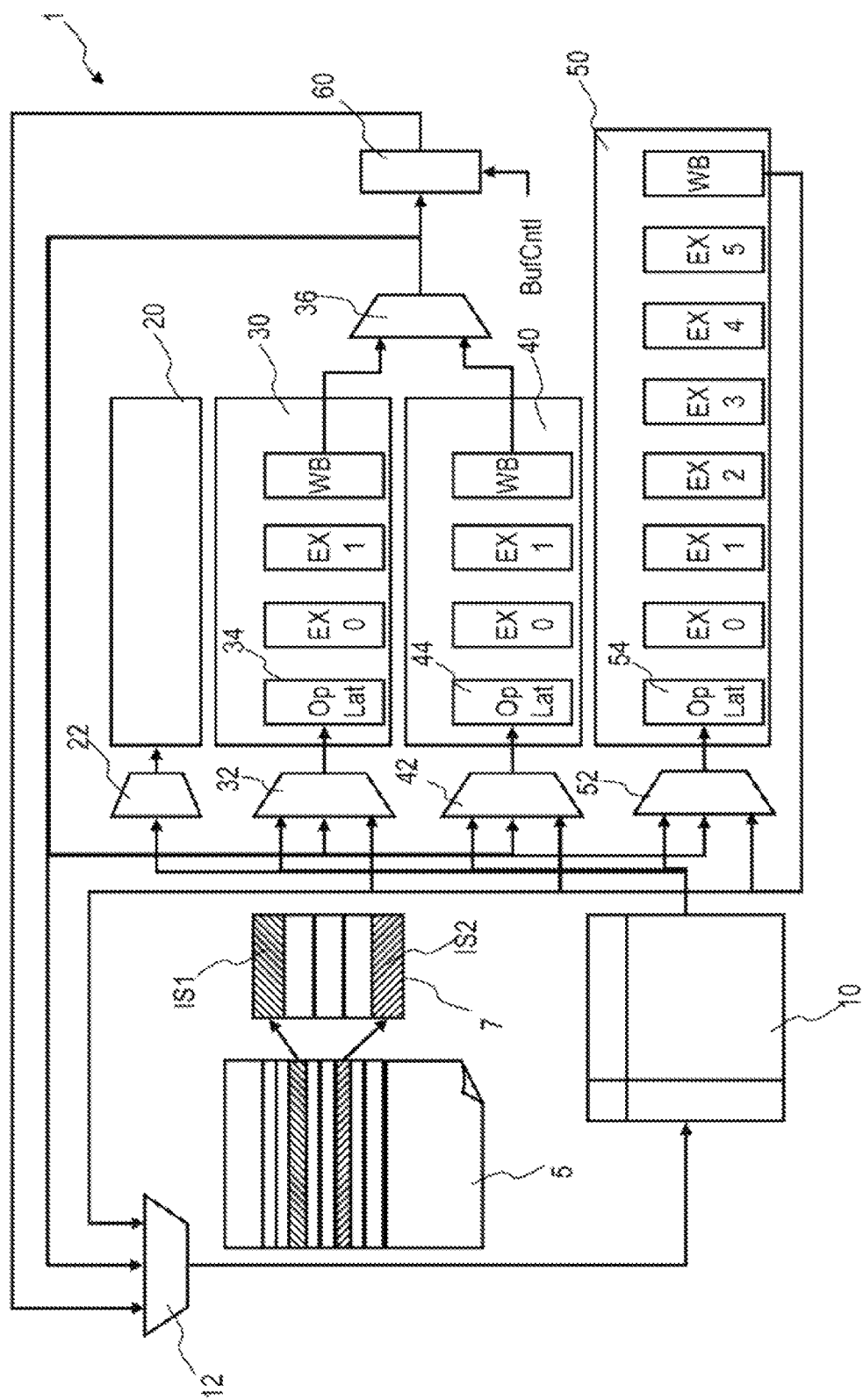
FIG. 1 is a schematic block diagram of a system for pipelining out-of-order instructions, in accordance with embodiments.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Generally speaking, the embodiments chain at least two short instructions of various instruction types, wherein latency of a corresponding instruction chain matches the latency of a long instruction of the second latency type, wherein the latency of the each of the short instructions is shorter than the latency of the long instruction. The benefit of the chained short instructions is that the overall total latency equals the latency of a long running instruction.

The chaining of various short instruction types can apply various rules. If the writeback of a first short instruction is suppressed and the result is consumed by a second short instruction, both short instructions can be merged, if the result of the first short instruction is not consumed by a third instruction also.

A short instruction with a result consumed by a store instruction can be combined. Data consumed by a store instruction is typically overwritten within the next few cycles. This can be detected in advance, the writeback can be suppressed and both instructions can be merged into a chain. A store instruction does not allocate a writeback slot to the register file. In cases where the data consumed by a store instruction is used again, the data can be temporarily kept in a buffer and can be written to the register file in the writeback slot of the store instruction. Thus one or more short instructions with a succeeding store instruction can be merged or chained.

The buffer can be used to merge other short instructions than any store instructions. In this case the merging of following short instructions can be blocked until the buffer can write its content to the register file or the content becomes obsolete (write-after-write case). In addition it is not mandatory for the store instruction to consume the data of the first short instruction. If the buffer is added, any store instruction can be merged with any short instruction.

Two independent permute and/or integer operations can be combined to an instruction chain if one of the operations generates a "long living" result and the other one generates a "short living" result. A "long living" result means that the target register will be used for more than one source register. A "short living" result describes an intermediate result, which is only used by a dependent following instruction. "Short living" results can be detected. Once an architected register is re-/over-written, the "older" content is obsolete. Further any two dependent short instructions can be chained, if at least one of them generates a "short living" result used by the depending second instruction, which may generate a "long living" result.

Embodiments of the inventive subject matter combine two or more short instructions and pipeline this combination with longer instructions to prevent writeback conflicts. Data dependency, if any, between the two short instructions can be resolved by forwarding data from the first instruction to the second instruction. A writeback from the first instruction can be prevented, and a writeback can be performed on completion of the second instruction.

As will be appreciated by one skilled in the art, aspects of the inventive subject matter may be embodied as a system, method or computer program product. Accordingly, aspects of the inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the inventive subject matter are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
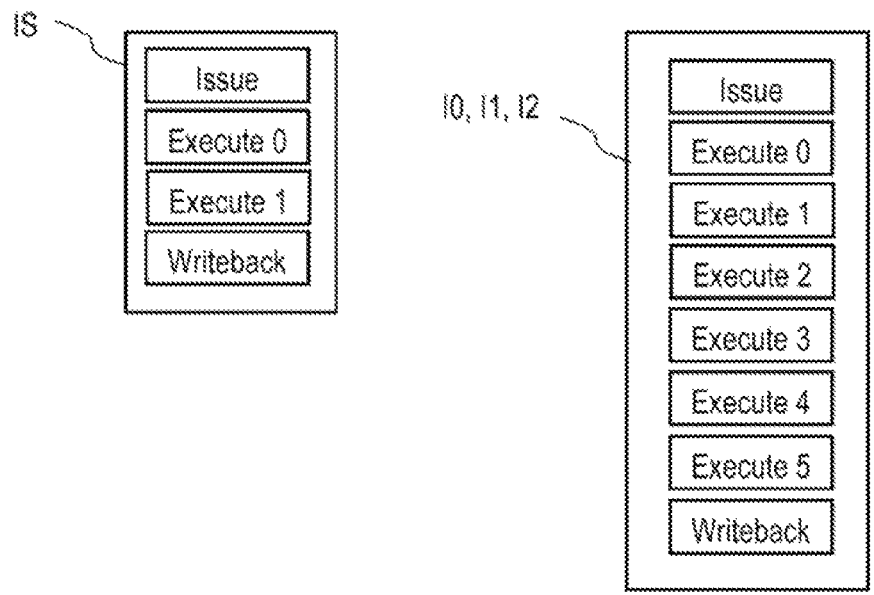
FIG. 2 is a schematic diagram of two instruction types, one with a short latency and one with a long latency used in the system for pipelining out-of-order instructions of FIG. 1.
Figure 3:
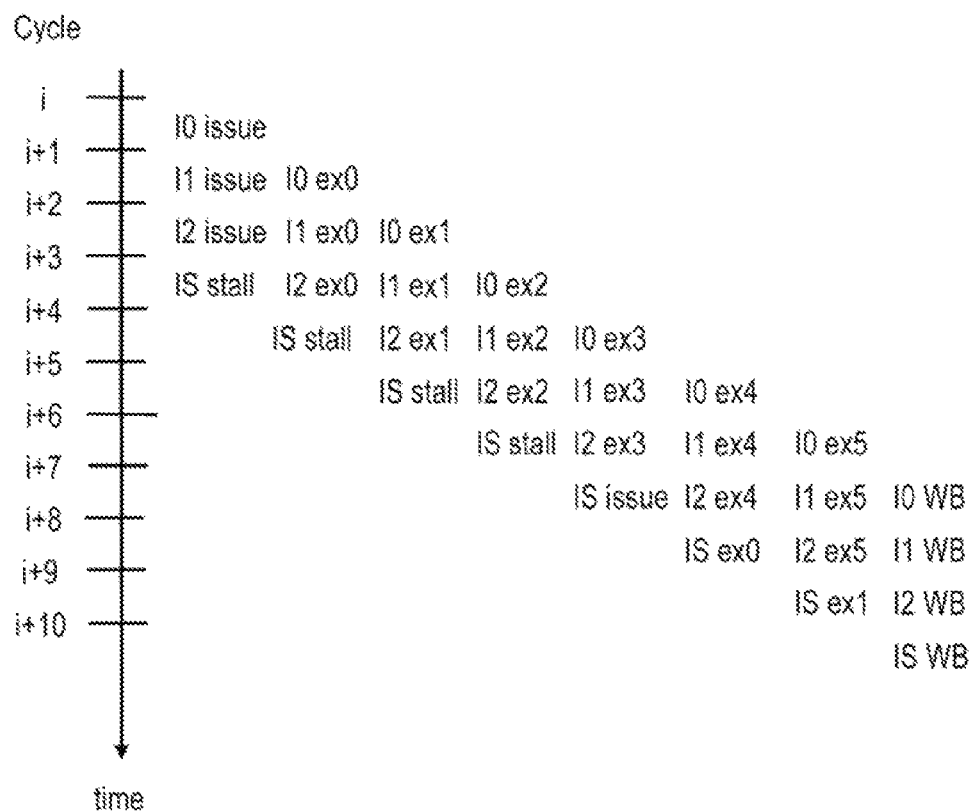
FIG. 3 is a schematic timing diagram of a series of long instructions and one short instruction showing a possible writeback conflict of systems for pipelining out-of-order instructions, in accordance with embodiments.

FIG. 1 shows a system 1 for pipelining out-of-order instructions, in accordance with an embodiment, FIG. 2 shows two instruction types, one with a first latency also referred to as short instruction and one with a second latency also referred to as long instruction, wherein the first latency is shorter than the second latency, FIG. 3 shows a series of long instructions and one short instruction showing a possible writeback conflict, and FIGS. 4 to 7 show different instruction chains, used by the system 1 for pipelining out-of-order instructions of FIG. 1.

Referring now to FIG. 1 to FIG. 7, the system 1 for pipelining out-of-order instructions comprises an instruction reservation station 5 for short instructions IS, IS1, IS2, IS3 of the first latency type and long instructions I0, I1, I2 of the second latency type, an issue queue 7 containing at least two short instructions IS1, IS2 of the first latency type, which are chained in an instruction chain 100, 200, 300, 400, 500 matching a latency of a long instruction I0, I1, I2 of the second latency type, a register file 10, at least one execution pipeline 30, 40 for short instructions IS, IS1, IS2, IS3 of the first latency type and at least one execution pipeline 50 for long instructions I0, I1, I2 of the second latency type; wherein results $tgt_a$, $tgt_{al}$, $tgt_{as}$, $tgt_b$, $tgt_{bl}$, $tgt_{bs}$, $tgt_c$ of the at least one execution pipeline 30, 40 for short instructions IS, IS1, IS2, IS3 of the first latency type are written to the register file 10 or preserved in an auxiliary buffer 60 or forwarded to inputs 32, 42, 52 of the execution pipelines 30, 40, 50; and wherein data of the auxiliary buffer 60 are written to the register file 10.

Still referring to FIG. 1 to FIG. 7, in the shown embodiment the system 1 for pipelining out-of-order instructions comprises two execution pipelines 30, 40 for short instructions IS, IS1, IS2, IS3 of the first latency type, wherein a first execution pipeline for short instructions IS, IS1, IS2, IS3 of the first latency type comprises a fixed point unit 30 with an operand latch 34, two execution stages EX0, EX1 and a writeback stage WB, and a second execution pipeline for short instructions IS, IS1, IS2, IS3 of the first latency type comprises a vector processing unit 40 with an operand latch 44, two execution stages EX0, EX1 and a writeback stage WB, one execution pipeline 50 for long instructions I0, I1, I2 of the second latency type, comprising a floating point unit 50 with an operand latch 44, six execution stages EX0, EX1, EX2, EX3, EX4, EX5 and a writeback stage WB, and a local storage unit 20, performing a store instruction as short instruction producing no result.

In the example system 1 for pipelining out-of-order instructions four different types of instructions are executed, for example, floating point unit arithmetic, vector permute, vector fixed point and store operations. Due to the different operational complexity the pipeline lengths of the four execution pipelines 30, 40, 50 are different. Store operations have the lowest latency, fixed and permute type operations have intermediate latency, whereas floating point operations have the longest latency. Those of skill in the art having the benefit of the disclosure will appreciate that other instruction types may be executed, and that different numbers of pipelines and pipeline lengths are possible and within the scope of the inventive subject matter.

Referring to FIG. 1, the result of the floating point unit 50 can be written to the register file 10 or fed in the execution pipelines 30, 40, 50 again. At the top of the issue queue 7 (next to issue) is a marked short instruction IS1. At a lower position there is another marked short instruction IS2. These two short instructions IS1, IS2 are merged, wherein the second instruction IS2 is already placed in a timeslot in the issue queue 7 corresponding to a point in time it has to be issued to catch the result of the first instruction IS1. The first short instruction IS1 is issued to the vector processing unit 40, for example and the source operands are loaded in a corresponding operand latch 44 in a first issue cycle. When the first short instruction IS1 has passed the execution stages EX0, EX1 of the vector processing unit 40 a corresponding result is available at the output 36. The writeback process to the register file 10 is suppressed and the corresponding result is a short living result forwarded to the fixed point unit 30, for example, where the second short instruction IS2, which is now at the top of the issue queue 7, just started execution.

Instruction issue rules typically allow one instruction issue per cycle if the execution pipelines 30, 40, 50 are available, the instructions IS, IS1, IS2, IS3, I0, I1, I2 have their source operands available from the register file 10 or data forwarding paths, and the instruction completion and data writeback will not collide with any other instruction in flight, i.e. a long running instruction I0, I1, I2 will complete in m cycles, the short running instruction IS, IS1, IS2, IS3 in n<m cycles. Issue of the short instruction IS, IS1, IS2, IS3 may not be allowed m-n cycles after the issue of the long running instruction I0, I1, I2. An instruction chain may be formed that has the latency of a long running instruction I0, I1, I2 and will also complete in m cycles. It is desirable that the number m of cycles of a long instruction I0, I1, I2 is at least twice a number n of cycles of a short instruction IS, IS1, IS2, IS3, however such a ratio is not a requirement.

Referring now to FIGS. 2 and 3, in the following a writeback conflict is described. FIG. 2 shows two different instruction types, wherein a first instruction type comprises an issue cycle Issue, two execution cycles Execute 0, Execute 1 and one writeback cycle Writeback, and a second instruction type comprises an issue cycle Issue, six execution cycles Execute 0 to Execute 5 and one writeback cycle Writeback. Since the long latency instructions I0, I1, I2 complete seven cycles after issue, the writeback path is blocked and a short latency instruction IS cannot be issued four cycles after the long running instruction I0, I1, I2 is issued. In previous systems, if there is a series of three long running instructions I0, I1, I2 there may be no chance to start a short running instruction IS since the issue of any instruction is blocked for four consecutive cycles. Then a short running instruction IS can be issued which can writeback the result one cycle after the latest long running instruction I2 is completed. Thus a solution to the short latency instruction stall condition is to extend the short latency instruction IS to a long latency instruction by adding stall cycles. This method will work to remove the stall condition but will reduce the instruction throughput and thus performance of an out-of-order system or processor.

Referring now to FIG. 4 to FIG. 7, different scenarios of the chaining of various short instruction types and methods for handling such scenarios are described.

Figure 4:
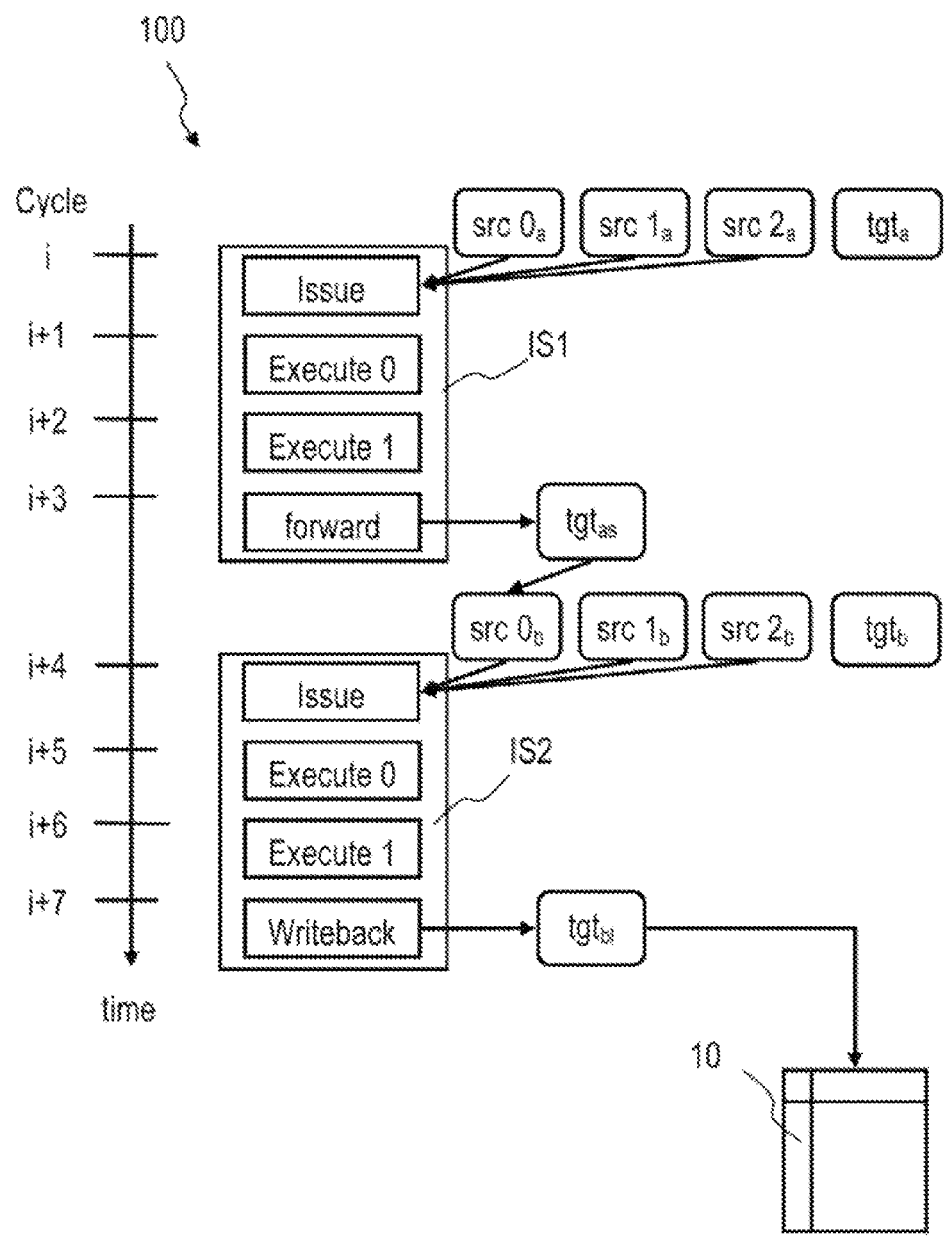
FIG. 4 is a schematic timing diagram of a first instruction chain combining two dependent short instructions in series used in the system for pipelining out-of-order instructions of FIG. 1, wherein results from a first short instruction are forwarded to a second short instruction.

In FIG. 4 a first scenario is shown, in which two dependent short instructions IS1, IS2 are combined in series to build a first instruction chain 100, wherein results $tgt_a$ from the first short instruction IS1 are forwarded to the second short instruction IS2. The first short instruction IS1 is started in a first issue cycle with all source operands $src0_a$, $src1_a$, $src2_a$, generating a "short living" result $tgt_{as}$ which is directly consumed by the second short instruction IS2 only. The issue of the second short instruction IS2 is performed in a second issue process after completion of the first short instruction IS1 with intermediate "short living" result $tgt_{as}$ of the first instruction IS1 as source operand $src0_b$ and additional source operands $src1_b$, $src2_b$. The result $tgt_b$ of the second short instruction IS2 is a "long living" result $tgt_{bl}$ of the two chained short instructions IS1, IS2. Since timing of the instruction chain 100 corresponds with the timing of a "long latency" instruction a writeback slot and a writeback port are available and the writeback of the common "long living" result $tgt_{bl}$ into the register file 10 is possible.

The first scenario shows the basic case where the second short instruction IS2 is the only consumer of the intermediate "short living" result $tgt_{as}$ of the first short instruction IS1. The "short living" result $tgt_{as}$ of the first instruction IS1 is directly forwarded as source operand $src0_b$ to the second short instruction IS2 and the "long living" result $tgt_{bl}$ of the second short instruction IS2 is written to the register file 10. Here two instructions IS1, IS2 with short latency are combined to the first instruction chain 100 with long latency, matching the latency of more complex instructions like floating point operations. So the short instructions IS1, IS2 are not delayed by long latency instructions due to writeback conflicts.

Many pairs of short instructions types can be found where a first instruction IS1 produces a result which is only used as intermediate result fed into a second depending instruction IS2. Thus only the result of the second short instruction IS2 is written back into the register file 10, since the result of the first instruction IS1 is only used by the second succeeding instruction IS2. Hence the architectural state of the register file 10 is not broken, if interruptions occur before or after the combined or chained pair of instructions IS1, IS2 is completed as an atomic instruction. In case of flushes/interrupts the pair of short instructions IS1, IS2 can be re-executed. The benefit of the chained pair of instructions IS1, IS2 is that the overall total latency equals the latency of a long running instruction, thus the issue stall of short instructions IS1, IS2 is solved. Instead of two short instructions IS1, IS2 a combined pair of two short instructions IS1, IS2 is issued as new "atomic" long instruction, wherein first issue cycle is performed for the first short instruction IS1 and a second issue cycle is performed for the second short instruction IS2 after finishing the first short instruction IS1.

Figure 5:
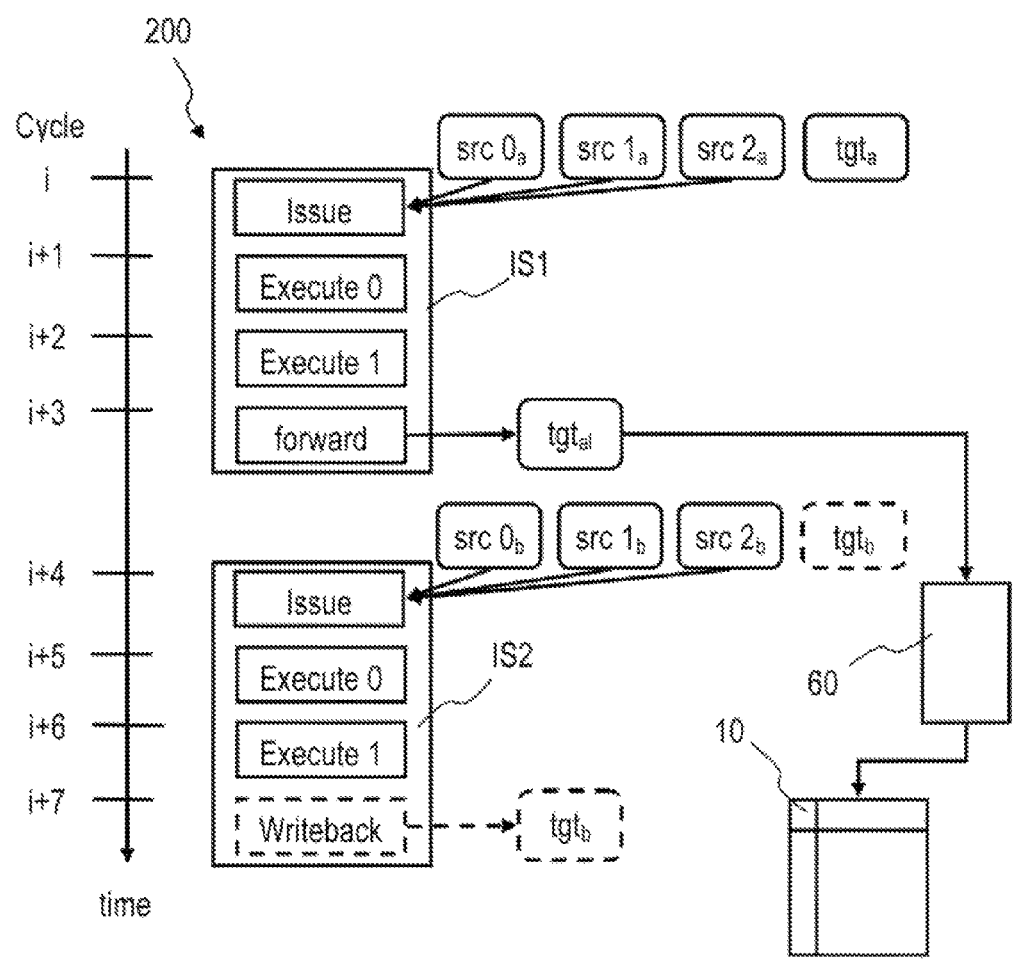
FIG. 5 is a schematic timing diagram of a second instruction chain combining two independent short instructions in series used in the system for pipelining out-of-order instructions of FIG. 1, wherein results from a first short instruction are preserved by an auxiliary result register.

In FIG. 5 a second scenario is shown, in which two independent short instructions IS1, IS2 are combined in series to build a second instruction chain 200, wherein even the results $tgt_a$ from the first short instruction IS1 are to be written into the architected state of the register file 10 since multiple succeeding instructions may have a data dependency. The first short instruction IS1 is started in a first issue cycle with all source operands $src0_a$, $src1_a$, $src2_a$, generating a "long living" result $tgt_{as}$ which is not written back into the register file 10 once the first instruction IS1 completes, since a previously issued long running instruction may block the actual writeback slot and the writeback/forwarding path. This is the original stall condition. Since the "long living" result $tgt_{al}$ of the first instruction IS1 is not only used by the second short instruction IS2, the "long living" result $tgt_{al}$ is preserved by the auxiliary buffer 60, whose content is written back into the appropriate target register of the register file 10 later on once an additional writeback slot and the writeback/forwarding path are available based on a control signal BufCntl. Since the second short instruction IS2 may use additional source operands $src0_b$, $src1_b$, $src2_b$, the second issue provides the additional source operands $src0_b$, $src1_b$, $src2_b$, to the second short instruction IS2 transparently. The second short instruction IS2 may generate no result, which is stored into the register file 10, or may generate a "long living" result $tgt_{bl}$, which is stored into the register file 10, shown in FIG. 6, or may generate a "short living" result $tgt_{bs}$, which is directly consumed by a following third short instruction IS3 only, shown in FIG. 7.

The second scenario shows the case where the second short instruction IS2 generates no result which is stored into the register file 10, i.e. control instruction, status instruction, storing operation. Since timing of the instruction chain 200 corresponds with the timing of a "long latency" instruction an actual writeback slot and a writeback port are available and the writeback of the "long living" result $tgt_{al}$ into the register file 10 is possible. In the second scenario the first instruction IS1 uses the writeback slot of the second instruction IS2 for writing back the "long living" result $tgt_{a1}$ into the register file 10 based on the control signal BufCntl.

Figure 6:
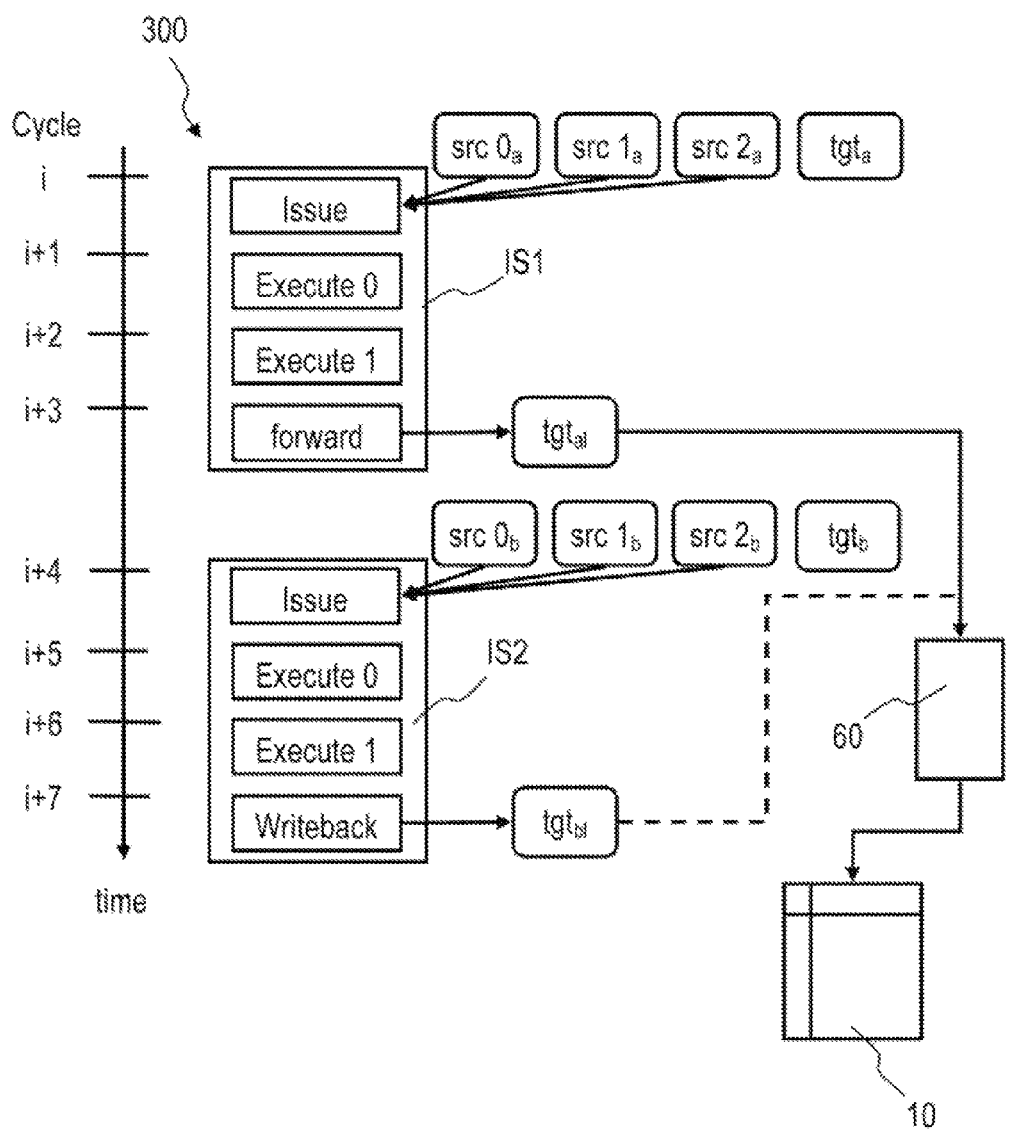
FIG. 6 is a schematic timing diagram of a third instruction chain combining two independent short instructions in series generating long living results used in the system for pipelining out-of-order instructions of FIG. 1, wherein long living results from a first short instruction are preserved by an auxiliary result register, and wherein long living results from a second short instruction are preserved by the auxiliary result register or written back directly to a register file.

In FIG. 6 a third scenario is shown, in which two independent short instructions IS1, IS2 are combined in series to build a third instruction chain 300, wherein the results $tgt_a$ from the first short instruction IS1 and the results $tgt_b$ from the second short instruction IS2 are to be written into the architected state of the register file 10 since multiple succeeding instructions may have a data dependency. Corresponding to the second scenario shown in FIG. 5 the first short instruction IS1 is started in a first issue cycle with all source operands $src0_a$, $src1_a$, $src2_a$, generating a "long living" result $tgt_{as}$ which is not written back into the register file 10 once the first instruction IS1 completes, since a previously issued long running instruction may block the actual writeback slot and the writeback/forwarding path. The "long living" result $tgt_{a1}$ is preserved by the auxiliary buffer 60, whose content is written back into the appropriate target register of the register file 10 later on once an additional writeback slot and the writeback/forwarding path are available based on the control signal BufCntl. Since the second short instruction IS2 may use additional source operands $src0_b$, $src1_b$, $src2_b$, the second issue provides the additional source operands $src0_b$, $src1_b$, $src2_b$, to the second short instruction IS2 transparently. The third scenario shows the case where the second short instruction IS2 generates a "long living" result $tgt_{b1}$, which is also to be stored into the register file 10. Therefore the "long living" result $tgt_{b1}$ of the second instruction IS2 is in a first case directly written back into the register file 10 using the writeback slot of the second instruction IS2, wherein the "long living" result $tgt_{a1}$ of the first instruction IS1 is kept in the auxiliary buffer 60 and written back into the appropriate target register of the register file 10 later on once an additional writeback slot and the writeback/forwarding path are available based on the control signal BufCntl.

In a second case the content of auxiliary buffer 60, i.e. the "long living" result $tgt_{a1}$ of the first instruction IS1, is written back into the register file 10 using the writeback slot of the second instruction IS2 based on the control signal BufCntl, wherein the "long living" result $tgt_{b1}$ of the second instruction IS2 is preserved in the auxiliary buffer 60 and written back into the appropriate target register of the register file 10 later on once an additional writeback slot and the writeback/forwarding path are available based on the control signal BufCntl.

Figure 7:
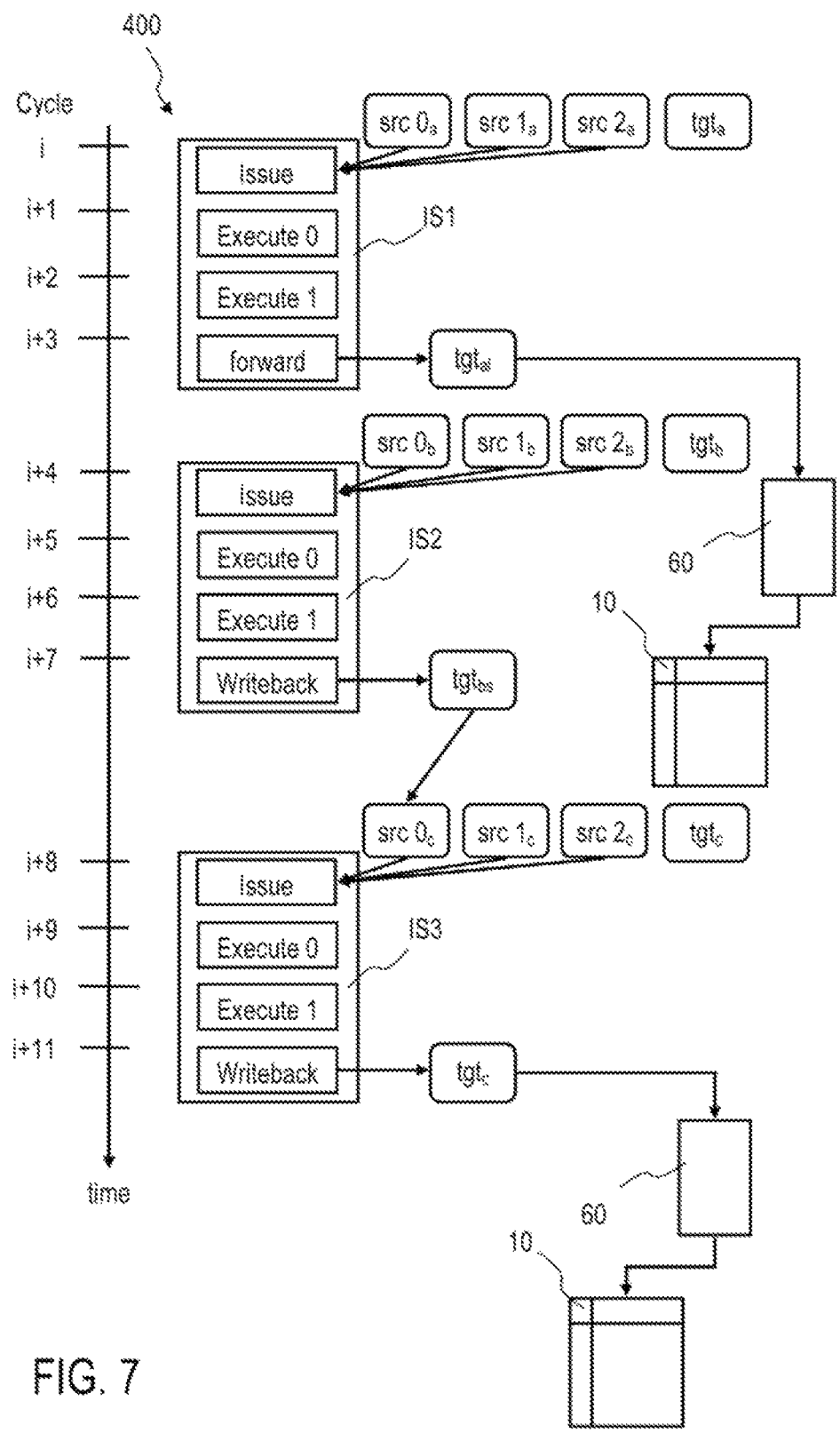
FIG. 7 is a schematic timing diagram of a fourth instruction chain combining two independent short instructions in series used in the system for pipelining out-of-order instructions of FIG. 1, wherein long living results from a first short instruction are preserved by an auxiliary result register, and wherein short living results from a second short instruction are forwarded to a dependent third instruction.

In FIG. 7 a fourth scenario is shown, in which two independent short instructions IS1, IS2 are combined in series to build a fourth instruction chain 400, wherein the results $tgt_a$ from the first short instruction IS1 are "long living" result $tgt_{a1}$ to be written into the architected state of the register file 10, and the results $tgt_b$ from the second short instruction IS2 are "short living" results $tgt_{bs}$ only for a following dependent third short instruction IS3. Corresponding to the third scenario shown in FIG. 6 the first short instruction IS1 is started in a first issue cycle with all source operands $src0_a$, $src1_a$, $src2_a$, generating a "long living" result $tgt_{as}$ which is preserved by the auxiliary buffer 60. Since the second short instruction IS2 may use additional source operands $src0_b$, $src1_b$, $src2_b$, the second issue provides the additional source operands $src0_b$, $src1_b$, $src2_b$, to the second short instruction IS2 transparently. The fourth scenario shows the case where the second short instruction IS2 generates a "short living" result $tgt_{bs}$, which is forwarded to the third short instruction IS3. The issue of the third short instruction IS3 is performed in a third issue process after completion of the second short instruction IS2 with intermediate "short living" result $tgt_{bs}$ of the second instruction IS2 as source operand $src0_c$ and additional source operands $src1_c$, $src2_c$. The result $tgt_c$ of the third short instruction IS3 is a "long living" result $tgt_a$ preserved in the auxiliary buffer 60 and written back into the appropriate target register of the register file 10 later on once an additional writeback slot and the writeback/forwarding path are available. In the fourth scenario the first instruction IS1 uses the writeback slot of the second instruction IS2 for writing back the "long living" result $tgt_{a1}$ into the register file 10 based on the control signal BufCntl.

FIG. 8 to FIG. 11 show methods for pipelining out-of-order instructions, in accordance with embodiments.

Figure 8:
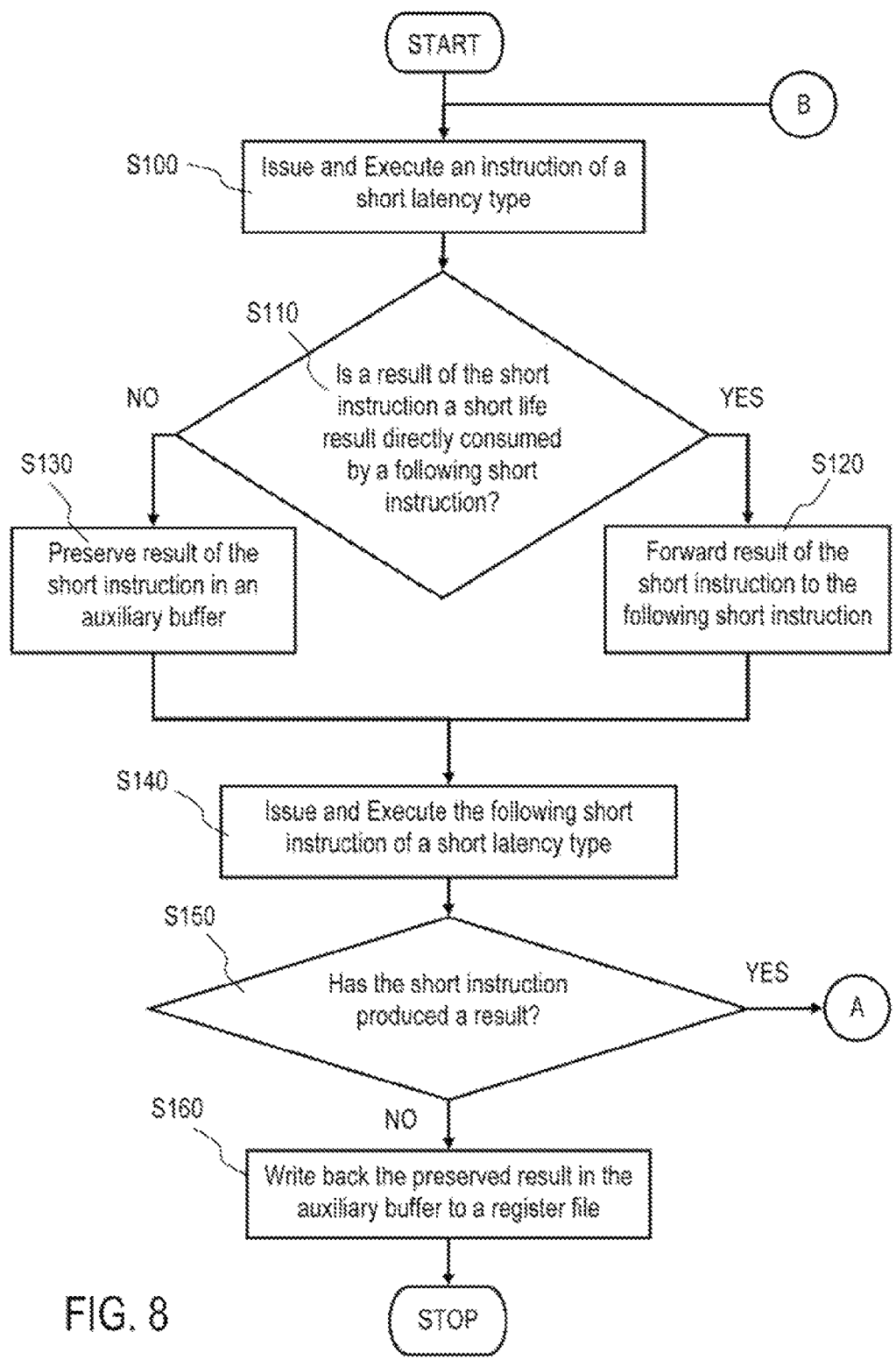
FIG. 8 to FIG. 11 are schematic flow diagrams of methods for pipelining out-of-order instructions, in accordance with embodiments.

Referring now to FIG. 8, according to embodiments of the method for pipelining out-of-order instructions, in step S100 an instruction IS1 of a short latency type is issued and executed. In a step S110 it is checked, if a following short instruction IS2 directly consumes a result of the short instruction IS1. In case the following short instruction IS2 consumes the result of the short instruction IS1, the result of the short instruction IS1 is forwarded to the following short instruction IS2 in step S120 otherwise the result of the short instruction IS1 is preserved in an auxiliary buffer 60 in step S130.

In step S140 the following instruction IS2 of a short latency type is issued and executed. In a step S150 it is checked, if the following short instruction IS2 has produced a result. If the following short instruction IS2 has not produced a result, the preserved result in the auxiliary buffer 60 is written back to the register file 10 in step S160.

Figure 9:
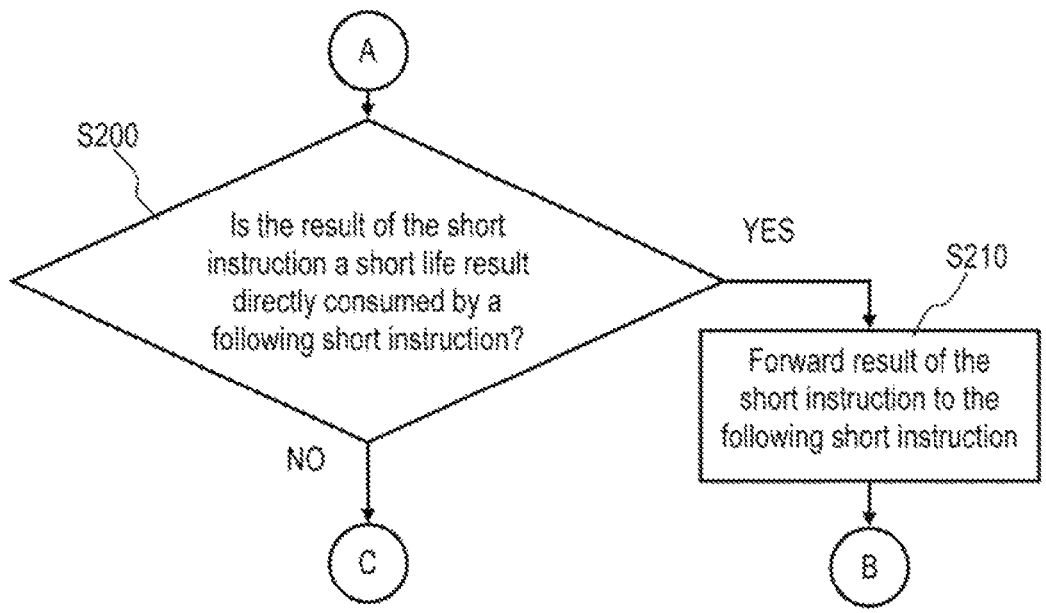

If the following short instruction IS2 has produced a result, it is checked in a step S200, shown in FIG. 9, if a following short instruction IS3 directly consumes the result of the short instruction IS2. In case the following short instruction IS3 consumes the result of the short instruction IS2, the result of the short instruction IS2 is forwarded to the following short instruction IS3 in step S210 and the method continues with step S100, shown in FIG. 8. Otherwise the method continues according to a first embodiment of the method for pipelining out-of-order instructions with a step S300, shown in FIG. 10, or according to a second embodiment of the method for pipelining out-of-order instructions with a step S340, shown in FIG. 11.

Figure 10:
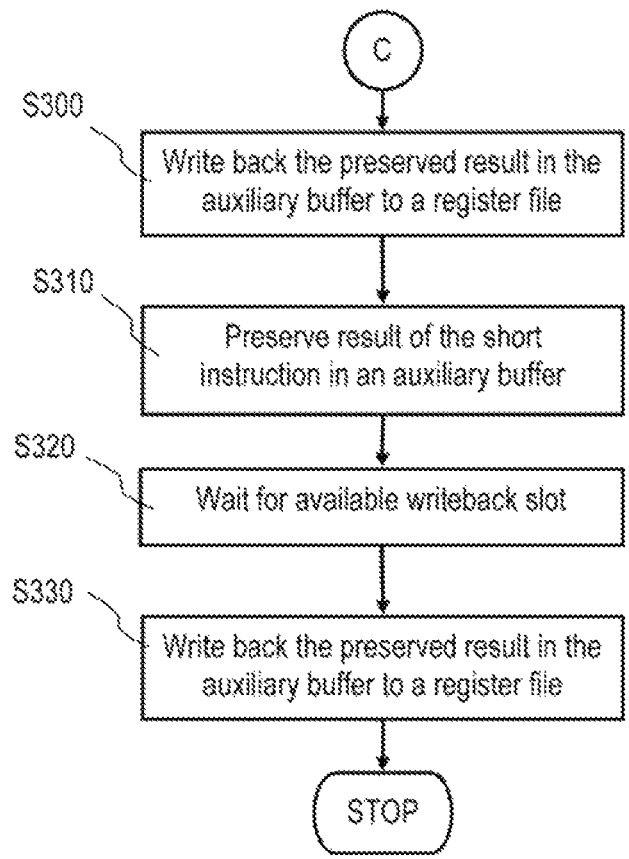

Referring now to FIG. 10, according to the first embodiment of the method for pipelining out-of-order instructions, the preserved result in the auxiliary buffer 60 is written back to the register file 10 in step S300. In step S310 the result of the short instruction is preserved in an auxiliary buffer 60. In step S320 the method waits for an available additional writeback slot. In step S330 an additional writeback slot is available and the preserved result in the auxiliary buffer 60 is written back to the register file 10.

Figure 11:
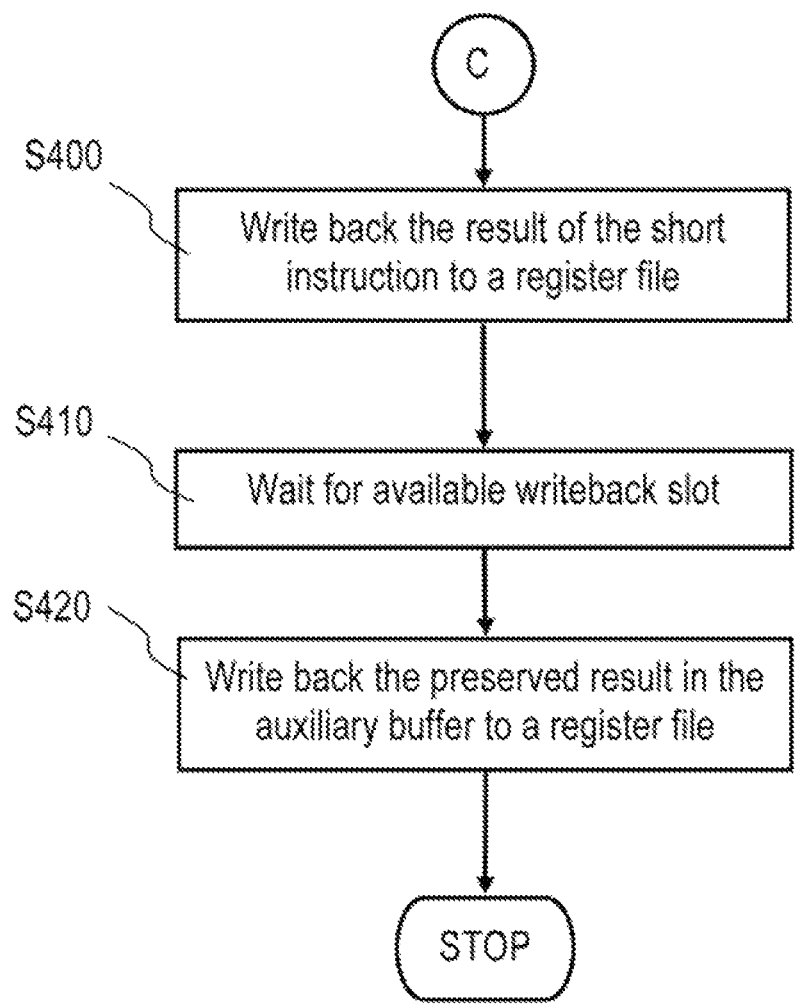

Referring now to FIG. 11, according to the second embodiment of the method for pipelining out-of-order instructions, the result of the short instruction is written back to the register file 10 in step S400. In step S410 the method waits for an available additional writeback slot. In step S420 an additional writeback slot is available and the preserved result in the auxiliary buffer 60 is written back to the register file 10.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

While the embodiments are described with reference to various implementations and exploitations, it will be understood that these embodiments are illustrative and that the scope of the inventive subject matter is not limited to them. In general, techniques for pipelining out of order instructions as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining an instruction chain comprising at least a first instruction having a first latency and a second instruction having a second latency, the first latency and the second latency each being less than a third latency of a third instruction;
   submitting the instruction chain to a first execution pipeline of a processor and the third instruction to a second execution pipeline of the processor, wherein execution of the instruction chain at least partially overlaps execution of the third instruction;
   writing a result of the instruction chain to a register file during one of a writeback slot of the second instruction or a write back slot of the third instruction;
   determining whether the second instruction is dependent on data from the first instruction; and
   in response determining that the second instruction is dependent on data from the first instruction, forwarding the data from the first instruction to the second instruction.

2. The method according to claim 1, wherein writing the result of the instruction chain to the register file comprises writing the result of the first instruction to the register file.

3. The method according to claim 2, wherein the first instruction produces a long life result, the method further comprising:
   storing the long life result in an auxiliary buffer;
   wherein writing the result of the instruction chain to the register file comprises writing the long life result from the auxiliary buffer to the register file.

4. The method according to claim 3, wherein the second instruction produces a second long life result, the method further comprising:
   storing the second long life result in the auxiliary buffer;
   determining that a second writeback slot is available; and
   in response to determining that the second writeback slot is available, writing the second long life result to the register file.

5. The method according to claim 3, further comprising:
   forwarding a short life result produced by the second instruction to a dependent fourth instruction having a latency less than the latency of the third instruction, the fourth instruction part of the instruction chain;
   receiving a second long life result;
   storing the second long life result in the auxiliary buffer;
   determining whether a second writeback slot is available; and
   in response to determining that the second writeback slot is available, writing the second long life result into the register file.

6. An processor comprising:
   a first execution pipeline;
   a second execution pipeline; and
   a register file;
   wherein the processor is configured to:
      determine an instruction chain comprising at least a first instruction having a first latency and a second instruction having a second latency, the first latency and the second latency each being less than a third latency of a third instruction,
      submit for concurrent execution the instruction chain to the first execution pipeline and the third instruction to the second execution pipeline of the processor,
      write a result of the instruction chain to the register file during one of a writeback slot of the second instruction or a write back slot of the third instruction;
      determine whether the second instruction is dependent on data from the first instruction; and
      in response a determination that the second instruction is dependent on data from the first instruction, forward the data from the first instruction to the second instruction.

7. The processor of claim 6, further comprising:
   an auxiliary buffer;
   wherein the first instruction produces a long life result, and
   further wherein the processor is further configured to:
      store the long life result in the auxiliary buffer,
      write the long life result from the auxiliary buffer to the register file, the long life result comprising the result of the instruction chain.

8. The processor of claim 7, wherein the second instruction produces a second long life result, and wherein the process is further configured to:
    store the second long life result in the auxiliary buffer;
    determine whether a second writeback slot is available; and
    in response to a determination that the second writeback slot is available, writing the second long life result to the register file.

9. The apparatus according to claim 7, wherein the processor is further configured to:
    forward a short life result produced by the second instruction to a dependent fourth instruction having a latency less than the latency of the third instruction, the fourth instruction part of the instruction chain;
    receive a second long life result;
    store the second long life result in the auxiliary buffer; and
    in response to a determination that a second writeback slot is available, write the second long life result into the register file.

10. A computer program product for controlling pipelining out of order instructions, the computer program product comprising:
    a computer readable storage medium having computer usable program code embodied therewith, the computer usable program code comprising a computer usable program code configured to:
    determine an instruction chain comprising at least a first instruction having a first latency and a second instruction having a second latency, the first latency and the second latency each being less than a third latency of a third instruction;
    submit for concurrent execution the instruction chain to a first execution pipeline of a processor and the third instruction to a second execution pipeline of the processor;
    write a result of the instruction chain to a register file during one of a writeback slot of the second instruction or a write back slot of the third instruction;
    determine whether the second instruction is dependent on data from the first instruction; and
    in response a determination that the second instruction is dependent on data from the first instruction, forward the data from the first instruction to the second instruction.

11. The computer program product according to claim 10, wherein the computer usable program code to write the result of the instruction chain to the register file comprises computer usable program code to write a result of the first instruction into the register file.

12. The computer program product according to claim 10, wherein the first instruction produces a long life result, wherein the computer usable program code further comprises computer usable program code to:
    store the long life result in an auxiliary buffer;
    wherein the computer usable program code to write the result of the instruction chain to the register file comprises computer usable program code to write the long life result from the auxiliary buffer to the register file.

13. The computer program product according to claim 12, wherein the second instruction produces a second long life result, wherein the computer usable program code further comprises computer usable program code to:
    store the second long life result in the auxiliary buffer;
    determine whether a second writeback slot is available; and
    in response to a determination that the second writeback slot is available, writing the second long life result to the register file.

14. The computer program product according to claim 12, wherein the computer usable program code further comprises computer usable program code to:
    forward a short life result produced by the second instruction to a dependent fourth instruction having a latency less than the latency of the third instruction, the fourth instruction part of the instruction chain;
    receive a second long life result;
    store the second long life result in the auxiliary buffer;
    determine whether a second writeback slot is available; and
    in response to a determination that the second writeback slot is available, write the second long life result into the register file.

* * * * *